(12) United States Patent
Johnson et al.

(10) Patent No.: US 8,754,902 B2
(45) Date of Patent: Jun. 17, 2014

(54) COLOR-SPACE SELECTIVE DARKNESS AND LIGHTNESS ADJUSTMENT

(75) Inventors: Garrett M. Johnson, San Francisco, CA (US); Russell Y. Webb, San Jose, CA (US)

(73) Assignee: Apple Inc., Cupertino, CA (US)

( * ) Notice: Subject to any disclaimer, the term of this patent is extended or adjusted under 35 U.S.C. 154(b) by 111 days.

(21) Appl. No.: 13/152,811

(22) Filed: Jun. 3, 2011

(65) Prior Publication Data
US 2012/0306906 A1  Dec. 6, 2012

(51) Int. Cl.
*G06T 15/50* (2011.01)
*G09G 5/02* (2006.01)

(52) U.S. Cl.
USPC .............. 345/589; 345/426; 345/600

(58) Field of Classification Search
USPC .......................................................... 345/589
See application file for complete search history.

(56) References Cited

U.S. PATENT DOCUMENTS

| | | |
|---|---|---|
| 5,818,975 A | 10/1998 | Goodwin et al. |
| 6,822,762 B2 | 11/2004 | Moroney et al. |
| 7,412,105 B2 | 8/2008 | Wilensky |
| 7,853,096 B1 | 12/2010 | Wilensky |
| 2012/0081577 A1* | 4/2012 | Cote et al. ............... 348/231.99 |

* cited by examiner

*Primary Examiner* — Ke Xiao
*Assistant Examiner* — Kwang Lee
(74) *Attorney, Agent, or Firm* — Wong, Cabello, Lutsch, Rutherford & Brucculeri, LLP

(57) ABSTRACT

Methods, systems, and apparatus, including computer programs encoded on a computer storage medium, for color-space selective darkness and lightness improvements. In one aspect, a method accessing multiple pixels that represent a digital image in an RGB color space. The accessed pixels are processed based on a darkness of the digital image resulting in a first set of processed pixels, and separately based on a lightness of the digital image resulting in a second set of processed pixels. Both sets of processed pixels are combined to generate a processed output image.

28 Claims, 13 Drawing Sheets

COLOR-SPACE SELECTIVE DARKNESS AND LIGHTNESS ADJUSTMENT

TECHNICAL FIELD

This document describes image processing.

BACKGROUND

A digital images that has been captured—using a variety of devices—can be stored on computer-readable storage media, rendered on a display device, and/or processed using an image processing computer software application. A digital image—which is formed from a collection of discrete picture elements, or "pixels"—can be stored on a computer-readable storage medium (for example, a hard disk of a computer system) essentially as a matrix of numbers. Each number represents a grayscale or a color scale value associated with a pixel, the collection of which collectively constitute the digital image. When the image is rendered on a display device, the numbers are passed through a lookup table (LUT) that maps the image intensity values to brightness values. If the LUT is linear, then the image can be mapped directly to the display. Otherwise, if the LUT is non-linear, the displayed image may not be an exact representation of the underlying image and thus must be further processed before being rendered on the display device.

In the context of color images, an appearance of the digital image on a display device can be manipulated by modifying the color values associated with the pixels that constitute the image. One technique to do so is referred to as "gamma correction" in which the color scale value of each pixel (typically normalized between 0 and 1) is exponentiated to a gamma value as shown in equation (1).

$$R_{processed} = R^{\Gamma} \quad (1)$$

In equation (1), R is a red component of an RGB color space value. Gamma correction according to equation (1) includes determining corresponding values for a green component (G) and a blue component (B).

For gamma, γ, values greater than 1.0, image processing according to the function referenced by equation (1) can increase a contrast of an image to make the image, when displayed, appear darker than its corresponding original image. Such image processing also can decrease highlight regions of the original image by darkening color scale values that constitute the highlight regions. Alternatively, image processing based on a gamma value of less than 1.0 can cause a decrease in a contrast by making the output image appear lighter overall relative to the original image. Consequently, processing in this manner can enhance the shadows of the original image.

SUMMARY

This specification describes technologies relating to color-space selective darkness and lightness adjustments.

One innovative aspect of the subject matter described here can be implemented as a method performed by data processing apparatus. Multiple pixels that represent a digital image in an RGB color space are accessed. The accessed multiple pixels are processed based on a darkness of the digital image to adjust a contrast a brightness of color space values of the multiple pixels, resulting in a first set of processed pixels. The accessed multiple pixels are processed based on a lightness of the digital image to adjust a contrast and a brightness of the color space values of the multiple pixels resulting in a second set of processed pixels. The first set of processed pixels and the second set of processed pixels are combined to generate a processed output image.

This, and other aspects, can include one or more of the following features. Processing the accessed multiple pixels to adjust the contrast and the brightness of color space values of the multiple pixels based on the darkness of the digital image can include adjusting the contrast and the brightness of the color space values of dark regions of the digital image differently from the contrast and brightness of the color space values of light regions of the digital image. Adjusting the contrast and the brightness of the color space values of dark regions of the digital image differently from the contrast and brightness of the color space values of light regions of the digital image can include increasing a contrast and a brightness of the dark regions, and decreasing a contrast and a brightness of the light regions. Processing the accessed multiple pixels to adjust the contrast and the brightness of color space values of the multiple pixels based on the darkness of the digital image can include adjusting a red component, a blue component, and a green component of a color space value of each pixel according to a gamma function based on a blur, a color scale value, and a user input defining an adjustment to the contrast and the brightness based on the darkness. The blur can be a Gaussian blur with a 2-pixel radius. The color scale value can be within a range of 0.4-2.0.

A region in the digital image that represents a particular tone can be identified based on hue angles and brightness values of pixels included in the region. The user input can be adjusted to modulate the gamma function in the identified region. Input can be received to adjust the darkness of the digital image. In response to receiving the input, corresponding values by which a red component, a blue component, and a green component of each pixel are to be adjusted based on the received input can be determined. Processing the accessed multiple pixels to adjust a contrast and the brightness of color space values of the multiple pixels based on the darkness of the digital image can include adjusting a red component, a blue component, and a green component of a color space value of each pixel based on determined corresponding value. Processing the accessed multiple pixels to adjust a contrast and a brightness of color space values of the multiple pixels based on the darkness of the digital image can include determining a common adjustment value from the corresponding values, and adjusting a color space of each pixel based on the common adjustment value. The common value can be one of a maximum of, a minimum of, an average of, or a median of the corresponding values.

Processing the accessed multiple pixels to adjust the contrast and a brightness of the color space values of the plurality of pixels based on the lightness of the digital image can include adjusting the contrast and the brightness of the color space values of light regions of the digital image differently from the contrast and the brightness of the color space values of dark regions of the digital image. Adjusting the contrast and the brightness of the color space values of light regions of the digital image differently from the contrast and the brightness of the color space values of the dark regions of the digital image can include increasing a contrast and a brightness of the light regions, and decreasing a contrast and a brightness of the dark regions. Processing the accessed multiple pixels to adjust the contrast and the brightness of color space values of the plurality of pixels based on the lightness of the digital image can include adjusting a red component, a blue component, and a green component of a color space value of each pixel according to a gamma function based on a blur, a color scale value, and a user input defining an adjustment to the contrast and the brightness based on the lightness, and according to a linear segment. Combining the first set of processed pixels and the second set of processed pixels can include combining using a luminance mask. Processing based on the darkness of the image and processing based on the lightness of the image can be order independent.

Another innovative aspect of the subject matter described here can be implemented as a computer storage medium encoded with a computer program, the program including instructions that when executed by data processing apparatus cause the data processing apparatus to perform operations including accessing multiple pixels that represent a digital image in an RGB color space, receiving input to adjust a darkness of the digital image, in response to receiving the input, adjusting the contrast and the brightness of color space values of the accessed multiple pixels based on a darkness of the digital image to generate a processed shadow image, and combining the processed shadow image with a processed highlight image. Adjusting to generate the processed shadow image includes adjusting the contrast and the brightness of dark regions of the digital image differently from the contrast and the brightness of light regions. Adjusting to generate the processed highlight image includes adjusting the contrast and the brightness of the color space values of the accessed multiple pixels based on a lightness of the digital image.

This, and other aspects, can include one or more of the following features. Adjusting the contrast and the brightness of dark regions of the digital image differently from the contrast and the brightness of light regions can include increasing a darkness of the dark regions while decreasing a brightness of the light regions. Adjusting a contrast and a brightness of color space values of the accessed plurality of pixels based on a darkness of the digital image can include adjusting a red component, a blue component, and a green component of a color space value of each pixel according to a gamma function based on a blur, a color scale value, and user input defining an adjustment. The blur can be a Gaussian blur having a pixel radius. The pixel radius can include a maximum of five pixels. The color space value can range from 0.5 to 2.0. The operations can include identifying a region in the digital image that represents a particular tone based on hue angles and brightness values of pixels included in the region, and modifying the user input to modulate the gamma function in the identified region. The operations can include generating the processed highlight image by adjusting the contrast and the brightness of the color space values of the accessed plurality of pixels based on the lightness of the digital image. Combining the processed shadow image with the processed highlight image can include combining using a luminance mask.

A further innovative aspect of the subject matter described here can be implemented as a system including data processing apparatus, and a computer storage medium encoded with a computer program, the program including instructions that when executed by the data processing apparatus cause the data processing apparatus to perform operations including accessing a plurality of pixels that represent a digital image in an RGB color space, receiving input to adjust a lightness of the digital image, in response to receiving the input, adjusting a contrast and a brightness of color space values of the plurality of pixels based on a lightness of the digital image to generate a processed highlight image, wherein the adjusting comprises adjusting the contrast and the brightness of light regions of the digital image differently from the contrast of dark regions, and combining the processed light image with a processed shadow image generated by adjusting the contrast and the brightness of the color space values of the plurality of pixels based on a darkness of the digital image.

This, and other aspects, can include one or more of the following features. Adjusting the contrast and the brightness of light regions of the digital image differently from the contrast of dark regions can include increasing a brightness of the bright regions while decreasing a darkness of the dark regions. Adjusting the contrast and the brightness of color space values of the plurality of pixels based on the lightness of the digital image can include adjusting a red component, a blue component, and a green component of a color space value of each pixel according to a gamma function based on a blur, a color scale value, and a user input defining an adjustment, and according to a linear segment. The operations can further include generating the processed shadow image by adjusting the contrast and the brightness of the color space values of the plurality of pixels based on the darkness of the digital image. Combining the processed highlight image with the processed shadow image can include combining using a luminance mask.

Another innovative aspect of the subject matter described here can be implemented as a computer-implemented method. Multiple pixels that represent a digital image in an RGB color space are accessed. Input to adjust a darkness or a brightness of the digital image is received. A region in the digital image that represents a particular tone is identified based on hue angles and brightness values of pixels included in the region. The darkness or the brightness of the identified region in the digital image is adjusted based on a common adjustment value determined for all pixels in the identified region. The darkness or the brightness of remaining regions in the digital image is adjusted based on a corresponding adjustment value determined for each pixel in the remaining regions. An output image is generated based on adjusting the darkness or the brightness of the identified region and based on adjusting the darkness or the brightness of the remaining regions.

This, and other aspects, can include one or more of the following features. For each pixel in the digital image, corresponding adjustment values by which a red component, a blue component, and a green component of each pixel are to be adjusted can be determined. The corresponding values can be based on the received input. The common adjustment value can be determined from the corresponding values. The common adjustment value can be one of a maximum of, a minimum of, an average of, or a median of the corresponding adjustment values. Receiving input to adjust a darkness or a brightness of the digital image can include receiving a first input to adjust a contrast and a brightness of color space values of the multiple pixels based on the darkness of the image, and receiving a second input to adjust a contrast a brightness of color space values of the multiple pixels based on the lightness of the image. The darkness of the digital image can be adjusted in response to receiving the first input. The brightness of the digital image can be adjusted in response to receiving the second input.

Particular implementations of the subject matter described in this specification may be implemented so as to realize one or more of the following potential advantages. Image processing performed by implementing the techniques described in this document may improve visibility of detail in dark areas of an image (shadow regions) as well as the light areas of the image (highlight regions) based upon user input. Implementations of the techniques described here may take into account different regions of color space to create more pleasing results for different colors. For example, the detail of shadows can be increased differently for skin tone colors relative to green foliage, such that the skin in an image does not become over-saturated nor too red, while grass and leaves appear colorful.

When processing an image to adjust a contrast and brightness based upon a darkness of the image, the entire image, and not merely dark regions, can be processed. Nevertheless, dark regions of the image can be processed differently from light regions. Similarly, when adjusting an entire image based upon a lightness of the image, light regions of the image can be processed differently from dark regions. Because the image is processed based upon darkness and lightness in respective, separate paths, image processing can be implemented using a small kernel. Also, the speed of processing can be increased.

Further, image processing can be performed by RGB-sensitive scaling of user input parameters. When adjusting the image based upon a lightness of the image, extended range image data can be recovered while controlling highlight adjustment. Furthermore, more global information, such as face detection, location, camera meta-data, dark noise estimation, gender, foliage, water, cloud detection, and the like, can be taken into account for each pixel when adjusting the image.

Details of one or more implementations of the subject matter described in this specification are set forth in the accompanying drawings and the description below. Other features, aspects, and potential advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
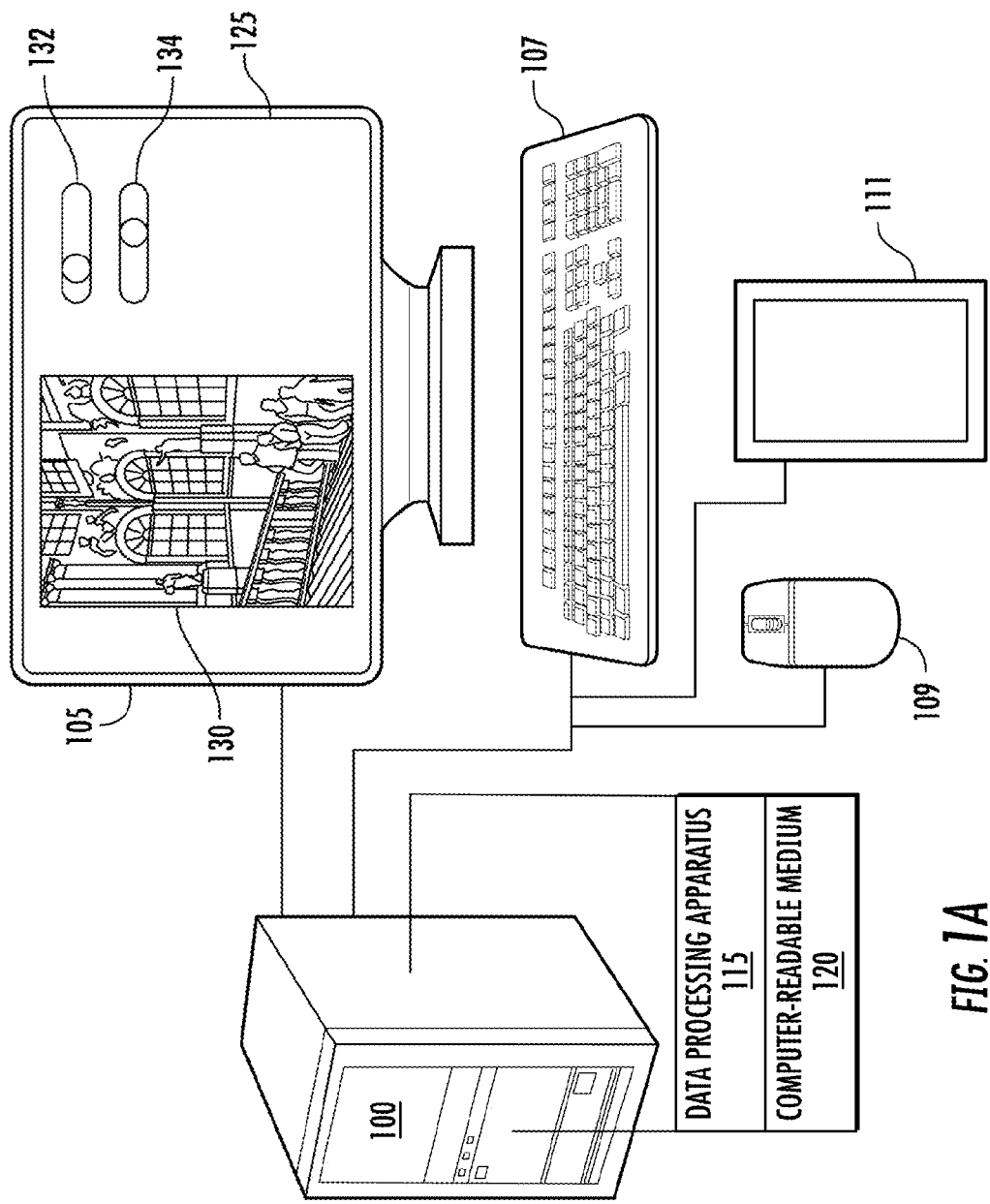
FIGS. 1A and 1B show example image processing systems.
Figure 1B:
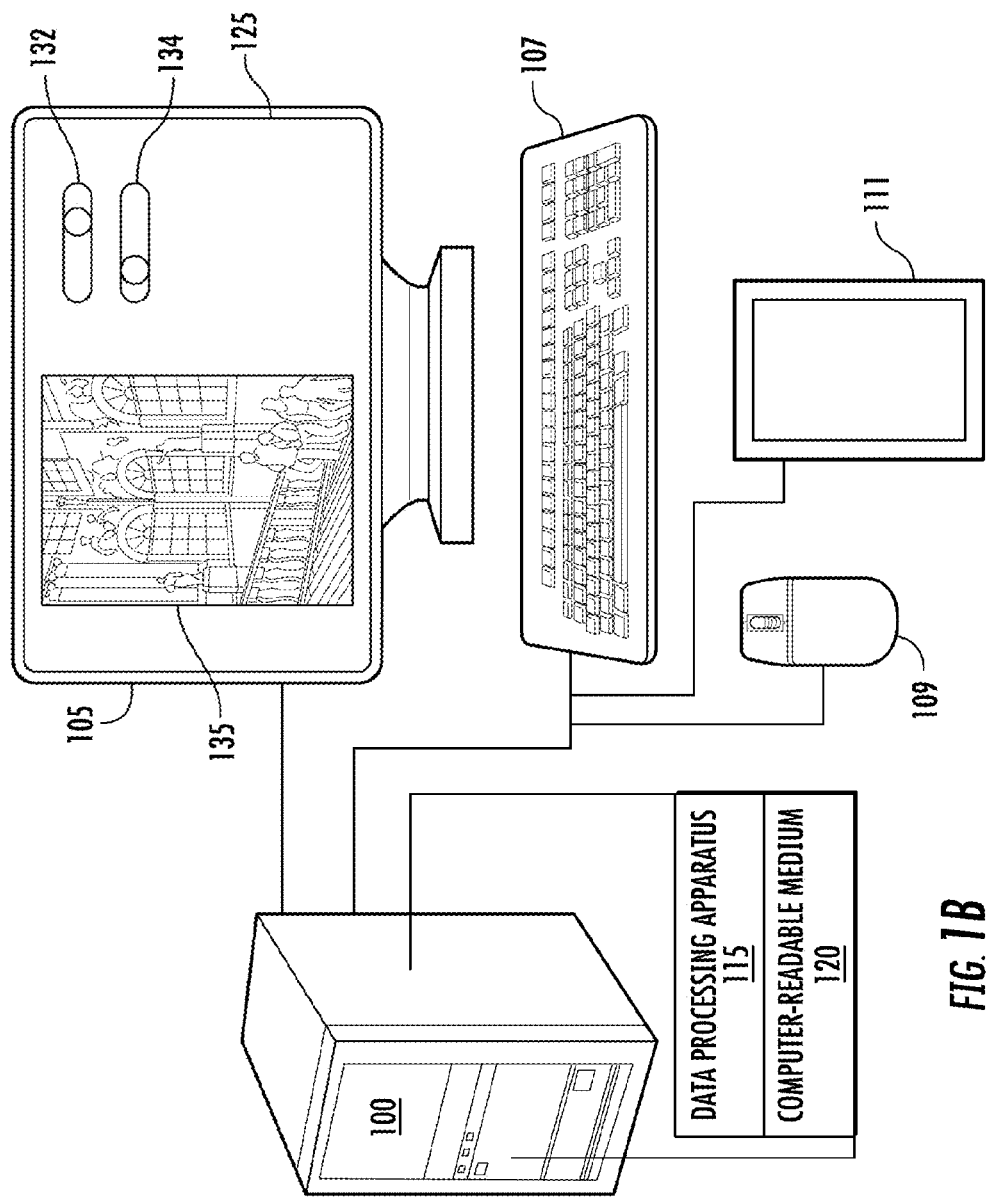

FIGS. 1A and 1B show example image processing systems. FIG. 1A, in particular, shows an image processing system that includes a computer system 100 that is coupled to a display device 105 and one or more input devices including a keyboard 107, a mouse 109, and a touch-sensitive input device 111. The computer system 100 (for example, a desktop computer, a laptop computer, a personal digital assistant, a tablet computer, a smart phone, and the like) can include data processing apparatus 115 that execute computer software instructions stored on a computer-readable storage medium 120 to implement an image processing computer software application that can process a digital image to improve the visibility of detail in the dark areas of the image (shadow region) as well as the light areas of the image (highlight region) based upon user input. In addition, when implementing the image processing application, the computer system 100 can process different regions of color space differently (for example, regions displaying human skin differently from regions displaying foliage).

The computer system 100 can display a user interface 125 in the display device 105, and, within the user interface 125, a digital image 130 and user-selectable controls (for example, a first slide control 132 and a second slide control 134). Using the input devices (the keyboard 107, the mouse 109, the touch-sensitive input device 111, or combinations of them), a user can provide input to adjust a darkness and a lightness of the digital image 130. In response to receiving and based upon the input, the computer system 100 can adjust a contrast and a brightness of the digital image as described below.

In some implementations, the computer system 100 can receive multiple pixels that represent the digital image 130 in an RGB color space. The computer system 100 can process the received pixels to adjust a contrast and a brightness of color space values of the multiple pixels based on a darkness of the digital image, and separately based on a lightness of the digital image. For example, the computer system 100 can process the received pixels in response to receiving user input to adjust the darkness and the lightness through the first control 132 and the second control 134, respectively. After processing, the computer system 100 can combine the processed pixels to generate a processed output image 135 (FIG. 1B).

An example of image processing to adjust a contrast and a brightness of a digital image was proposed in the literature, and is shown in (2).

$$R_{processed} = R^{2\left(\frac{0.5-\left(\frac{1}{blur}\right)}{0.5}\right)} \quad (2)$$

By implementing (2), the computer system 100 can create a per-pixel gamma value as a function of a low-passed or blurred input image. The computer system 100, in such implementations, can generate a gamma value for each pixel in the range of 0.5-2.0 based on the blurred version of the image. In some implementations, the computer system 100 implements image processing step, s and generates intermediate processed images as described with reference to FIGS. 2 and 3A-3H.

Figure 2:
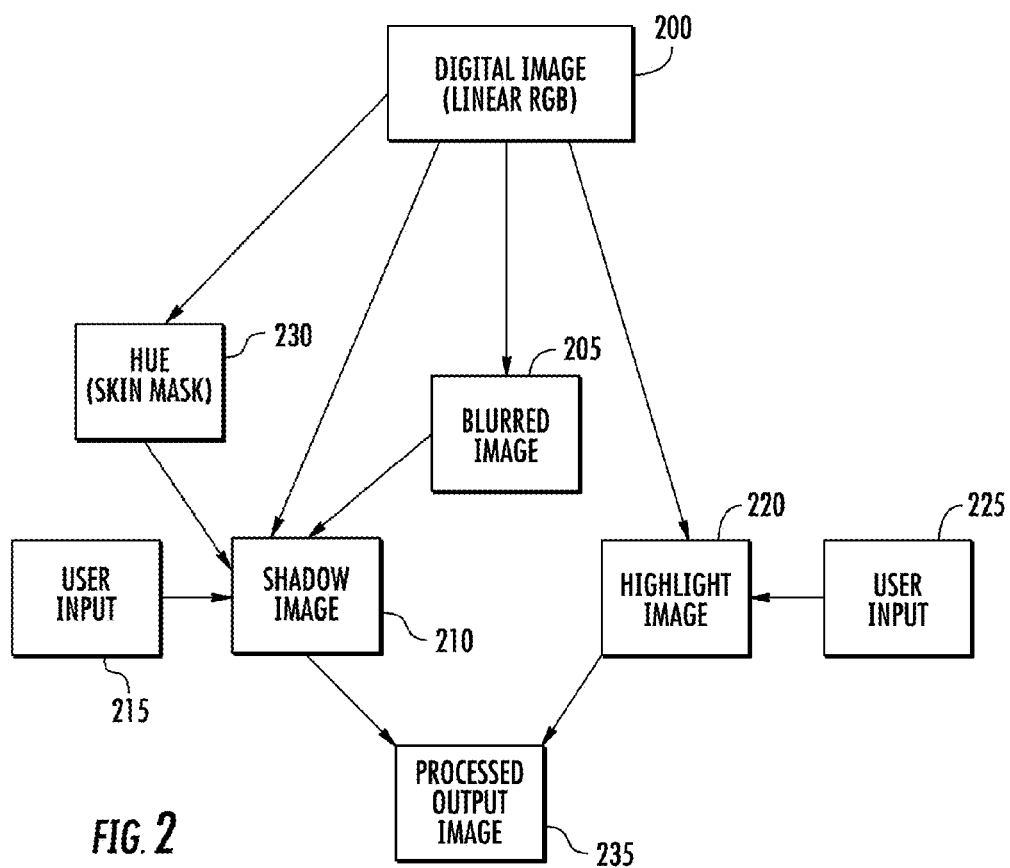
FIG. 2 shows a flowchart of images generated during image processing.
Figure 3A:
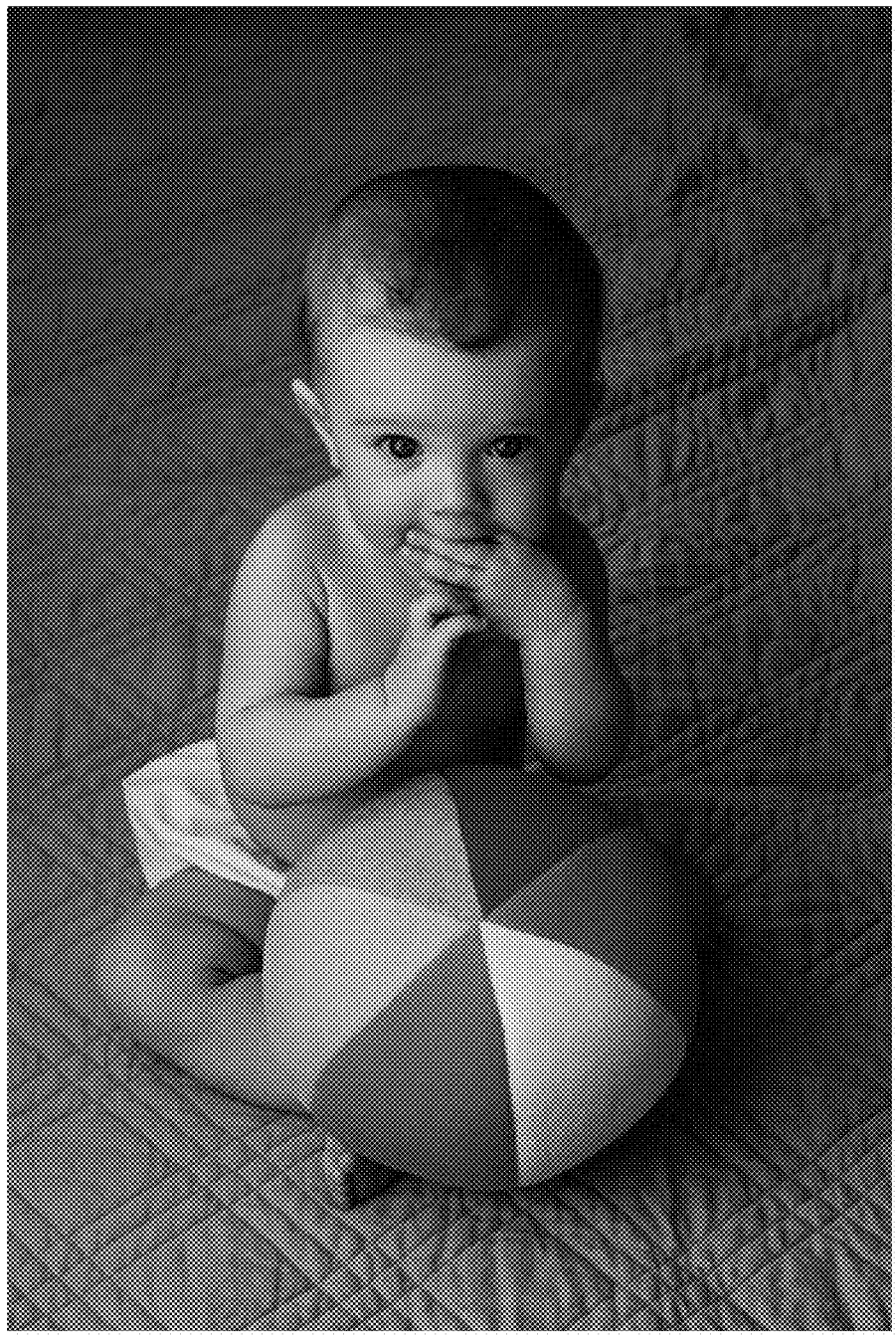
FIGS. 3A-H show example images generated during image processing.

FIG. 2 shows a flowchart of images generated during image processing. In some implementations, the computer system 100 receives a digital image, for example, the digital image shown in FIG. 3A, represented by multiple pixels. For example, the computer system 100 can store the digital image 130 in a non-linear encoding. As a first step in image processing, the computer system 100 can linearize the encoding and generate a digital image 200 represented by a linear encoding in the RGB color space.

The computer system 100 can receive a first user input to adjust a darkness and a second user input to adjust a lightness of the digital image 130, for example, through the first slide control 132 and the second slide control 134. In particular, the system 100 can receive the first and second user inputs in any order or simultaneously. Similarly, the computer system 100 can process the digital image 200 based on the input to adjust the darkness and then process the digital image 200 based on the input to adjust the lightness or vice versa. In some situations, the computer system 100 can implement both processing steps simultaneously, i.e., in parallel.

In some implementations, upon receiving user input to adjust the darkness of the digital image 130, the computer system 100 can process the digital image 200 to generate a blurred image 205 by implementing (3).

$$R_{processed} = R^{2^{\left(\frac{userInput - \left(\frac{blur}{colorScale}\right)}{0.5}\right)}} \quad (3)$$

In particular, the computer system 100 implements (3) for each pixel in the digital image 200. In (3), R is a red component of a color scale value of a pixel in digital image 200, and $R_{processed}$ is the processed red component of the color scale value of the pixel in the blurred image 205. The term "userinput" refers to the user input to adjust a darkness of the digital image 130. The term "colorScale/0.5" represents half the color scale, but alternatively can range between 0.4 and 2.0 of the color scale. The term "blur" refers to a local area surrounding each processed pixel. The local area can include a range of pixels, for example, between two and six pixels, or, alternatively, fewer than two (for example, zero pixels) or more than six pixels (for example, fifty pixels).

The computer system 100 determines similar values for the green component ($G_{processed}$) and for the blue component ($B_{processed}$) from the green component and the blue component of a color scale value of a pixel, respectively. Thus, the computer system 100 adjusts a red component, a blue component, and a green component of a color space value of each pixel according to a gamma function based on a blur, a color scale value, and a user input defining an adjustment to the contrast and the brightness based on the darkness of the digital image 200. To do so, the computer system 100 generates a blurred image 205 that includes as many pixels as the digital image 200 such that a pixel in the blurred image 205 is a blurred version of a corresponding pixel in the digital image 200. The computer system 100 then generates a shadow image 210 based on the digital image 200, the blurred image 215, and the user input 215.

In this manner, the computer system 100 implements (3) to adjust the contrast and the brightness of the color space values of dark regions of the digital image 200 differently from the contrast and brightness of the color space values of light regions of the digital image 200. To adjust the contrast and brightness of the dark regions differently from those of the light regions, the computer system 100 increases a contrast and a brightness of the dark regions while decreasing those of the light regions.

In some implementations, the user input can range from −0.5 to +0.5, or alternatively from −1.0 to +1.0. A user input of 0 indicates no adjustment, an input less than 0 indicates an input to adjust based on a darkness of the image, and an input greater than 0 is an input to lift shadows to see more detail in the image. For most of these values, the per-pixel gamma will be less than 1.0 and will result in the shadows being lifted. For some values, however, the per-pixel gamma value will be above 1.0, and will result in the shadows being darkened. Such a situation can be useful for low-contrast scenes (for example, foggy images) to which adding shadows may be preferable. Because the computer system 100 processes the digital image separately to adjust a darkness and a brightness, low gamma values are acceptable at this stage. The computer system 100 can use a small blur kernel (for example, a Gaussian blur with a 5-pixel radius) and preserve local contrast.

In some implementations, the computer system 100 can execute operations to increase a colorfulness and brightness of shadow regions in the digital image 200. For example, the computer system 100 can increase a brightness of green color in foliage. If, for example, an image includes green color representing foliage and blue color representing the sky, a common increase in brightness of both colors may not be desirable. Instead, it may be desirable to emphasize the blue sky but keep the green region relatively darker to increase contrast in foliage. The computer system 100 can execute operations to achieve this result by implementing (4).

$$userInput = userInput \cdot \left(\frac{rS \cdot inputR + gS \cdot inputG + bS \cdot inputB}{inputR + inputG + inputB + \varepsilon}\right) \quad (4)$$

In (4), inputR, inputG, and inputB are the red component, the green component, and the blue component of the RGB color space values, respectively, rS, gS, and bS are color space scalar values, and eps is a small number to prevent division by zero and to anchor the black pixels in the image. Example values of rS, gS, and bS could be 1.0, 0.8, and 1.1, respectively, which would increase the color of the blue region while not saturating the color of the green region. In alternative implementations, the computer system 100 can use a more specific hue-angle based scaling factor. In such implementations, the computer system 100 can scale the user input as a function of hue angle.

Thus, by implementing (4), the computer system 100 can augment the user input value with color-specific tuning. To do so, the computer system 100 can identify a region in the digital image 200 that represents a particular tone based on hue angles and brightness values of pixels included in the region, and adjust the user input to modulate the gamma function in the identified region. In particular, the computer system 100 adjusts a red component of a color space value of each pixel based on a determined corresponding value, and similarly adjusts a green component and a blue component. Each corresponding value represents a scaling factor by which the computer system 100 modifies the user input for each of the red component, the green component, and the blue component of a color space value of each pixel, when implementing (3).

In some situations, doing so can result in oversaturation of colors. For example, regions that represent skin tones can be depicted as red rather than pink. In such situations, the computer system 100 can determine corresponding scaling factors for each of the red, green, and blue components, but use a common value, selected from among the scaling factors, as "userinput" in (3). In some implementations, the computer system 100 can determine the same exponent for all three color-channels, and calculate the exponent as shown in (5a) and (5b).

$$expRGB = 2^{\left(\frac{userInput - \frac{blur}{colorScale}}{0.5}\right)} \quad (5a)$$

$$exp = \min(expR, expG, expB) \quad (5b)$$

By implementing (5a) and (5b), the computer system 100 determines a corresponding value for the red component, the green component, and the blue component of all color scale values of the pixels included in the digital image 200. The computer system 100 then exponentiates each of these values, and determines a common value from the exponentiated values. For each pixel, the computer system 100 can select the common value as one of a maximum of, a minimum of, a median of, or an average of the exponentiated red component, green component, and blue component of the color scale values, or variations of them.

In this manner, in response to receiving input to adjust the darkness of the digital image, the computer system 100 determines corresponding values by which a red component, a green component, and a blue component of each pixel are to be adjusted. The computer system 100 determines a common adjustment values from the corresponding values, and adjusts a color space value of each pixel based on the common adjustment value.

In some situations, implementing (5a) and (5b) results in skin-tone values of an output image being more pleasing relative to not doing so. However, in such situations, the non-skin regions may be too de-saturated. In some implementations, the computer system 100 can generate the shadow image 210 by using individual RGB gamma values for non-skin regions, and identical RGB gamma values for the skin region. To do so, the computer system 100 can create a skin mask calculated using hue angles and brightness values, or, alternatively, implement an RGB calculation shown in (6a)-(6h).

$$gray = \frac{inputR + inputG + inputB}{3.0} \quad (6a)$$

$$m = \frac{1.0}{(1.0 - gray) \cdot gray} \quad (6b)$$

$$gi = (1.0 - gray) \cdot m \quad (6c)$$

$$gii = gray \cdot m \quad (6d)$$

$$sat = \max((inputR - gray) \cdot gi, (gray - inputR) \cdot gii)) < 0.99 \quad (6e)$$

$$skin = \quad (6f)$$
$$\min((inputR - inputG), (2.0 \cdot inputG - inputB)) \cdot 4.0 \cdot (1.0 - sat) \cdot gi$$

$$skin = clamp(skin, 0.0, 1.0) \quad (6g)$$

$$skin = 0.15 + 0.17 \cdot skin \quad (6h)$$

By implementing (6a)-(6h), the computer system 100 can determine regions in a digital image 200 that are pink, and are likely skin. Upon determining such regions, the computer system 100 can implement a masking process (for example, a linear interpolation) to process regions of the digital image that represent skin tone differently from remaining regions.

In some implementations, upon receiving the multiple pixels that represent the digital image 200 in the RGB color space, and upon receiving input to adjust the digital image, the computer system 100 can implement (6a)-(6h) to identify a region in the digital image that represents a particular tone (for example, skin tone) based on hue angles and brightness values of pixels included in the region. The computer system 100 can further adjust the darkness or the brightness of the identified region based on a common adjustment value determined for all pixels in the identified region, for example, by implementing (5) shown above. The computer system 100 can adjust the darkness or the brightness of remaining regions in the digital image based on a corresponding adjustment value determined for each pixel in the remaining region, for example, by implementing (3) shown above. The computer system 100 can then generate an output image based on the adjustments of the identified region and of the remaining regions by implementing (7) shown below. In this manner, the computer system 100 can then use the skin mask to modulate between the per-color-channel gamma value for non-skin colors and the uniform gamma value for skin tone by implementing (7) shown below.

$$ex=mix(expRGB,exp,skin) \quad (7)$$

To determine the shadow image 210, the computer system 100 implements (8) shown below, resulting in a per-pixel, per-color-channel, color space location-dependent gamma function.

$$RGB_{shadow} = \frac{(colorScale \cdot RGB)^{ex}}{colorScale} \quad (8)$$

Figure 3B:
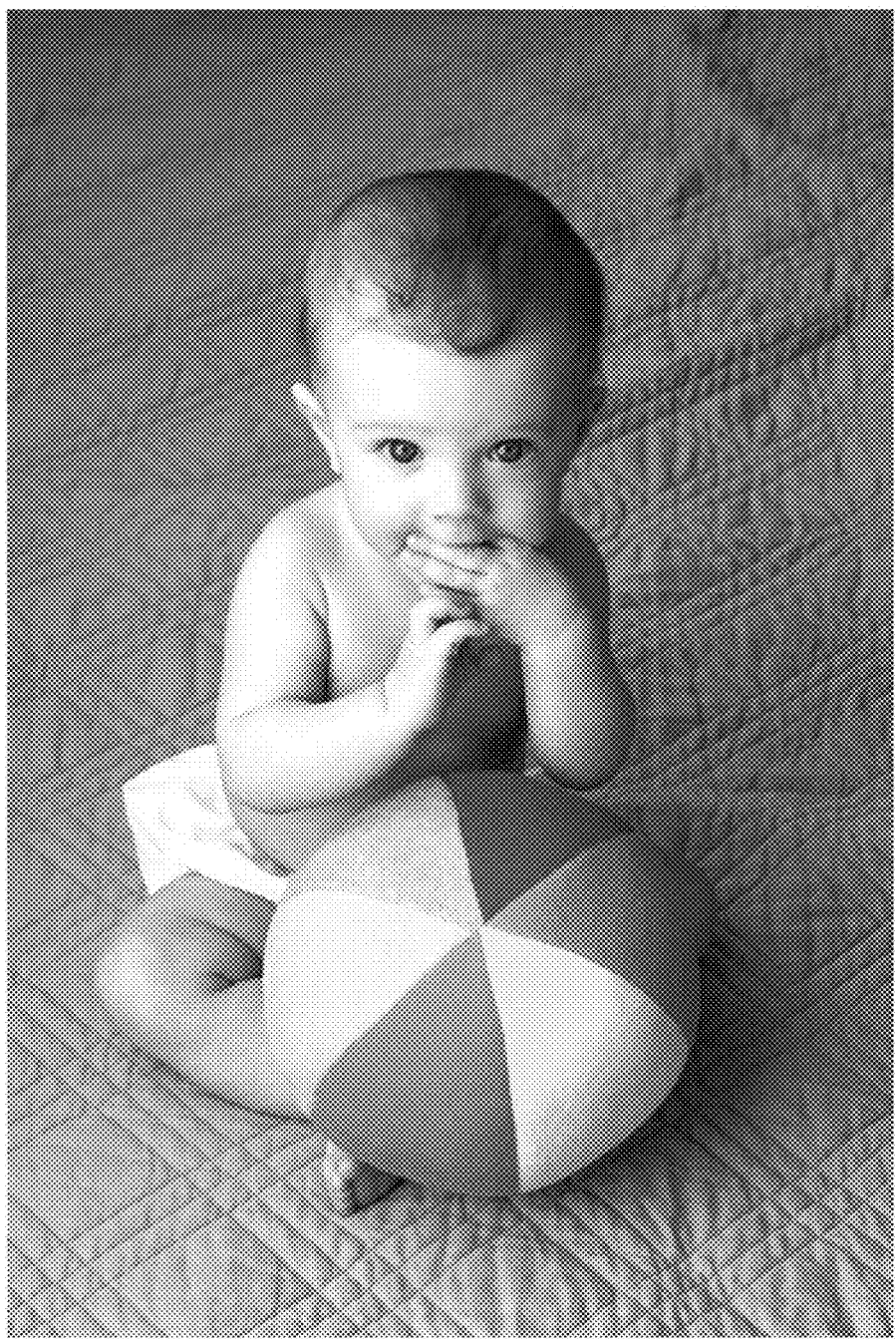

In (8), "colorScale" values are the same as those in (3) and (5), and can be, for example, 0.5. An example of a digital image that the computer system 100 generates by implementing (8) is shown in FIG. 3B. In some implementations, as an alternative or in addition to modifying the image processing based on detecting skin tone, the computer system 100 can be configured to modify image processing based on factors including face detection, location, camera meta-data, dark noise estimation, gender, foliage, water, cloud detection, and the like in one or more regions in the digital image.

From the digital image 200, the computer system 100 can separately determine a highlight image 220, for example, by determining a gamma correction with a linear segment, as shown below in (9a) and (9b). To do so, the computer system 100 can adjust the contrast and the brightness of the color space values of light regions of the digital image differently from the contrast and the brightness of the color space values of dark regions of the digital image. In particular, the computer system 100 can increase a contrast and a brightness of the light regions, and decrease a contrast and a brightness of the dark regions.

By implementing (9a) and (9b), the computer system 100 can bring values greater than 1.0 back into the 0-1.0 range, which is useful for highlight recovery when dealing with raw and high-dynamic range imagery.

$$d = \frac{e^{3.0 \cdot highInput - 6.0} - 1.0}{2.0 \cdot e^{3.0 \cdot highInput - 6.0} + 1.0} + 1.5 \quad (9a)$$

$$RGB_{highlight} = \left(\frac{inputRGB}{d}\right)^{highInput} \quad (9b)$$

Figure 3C:
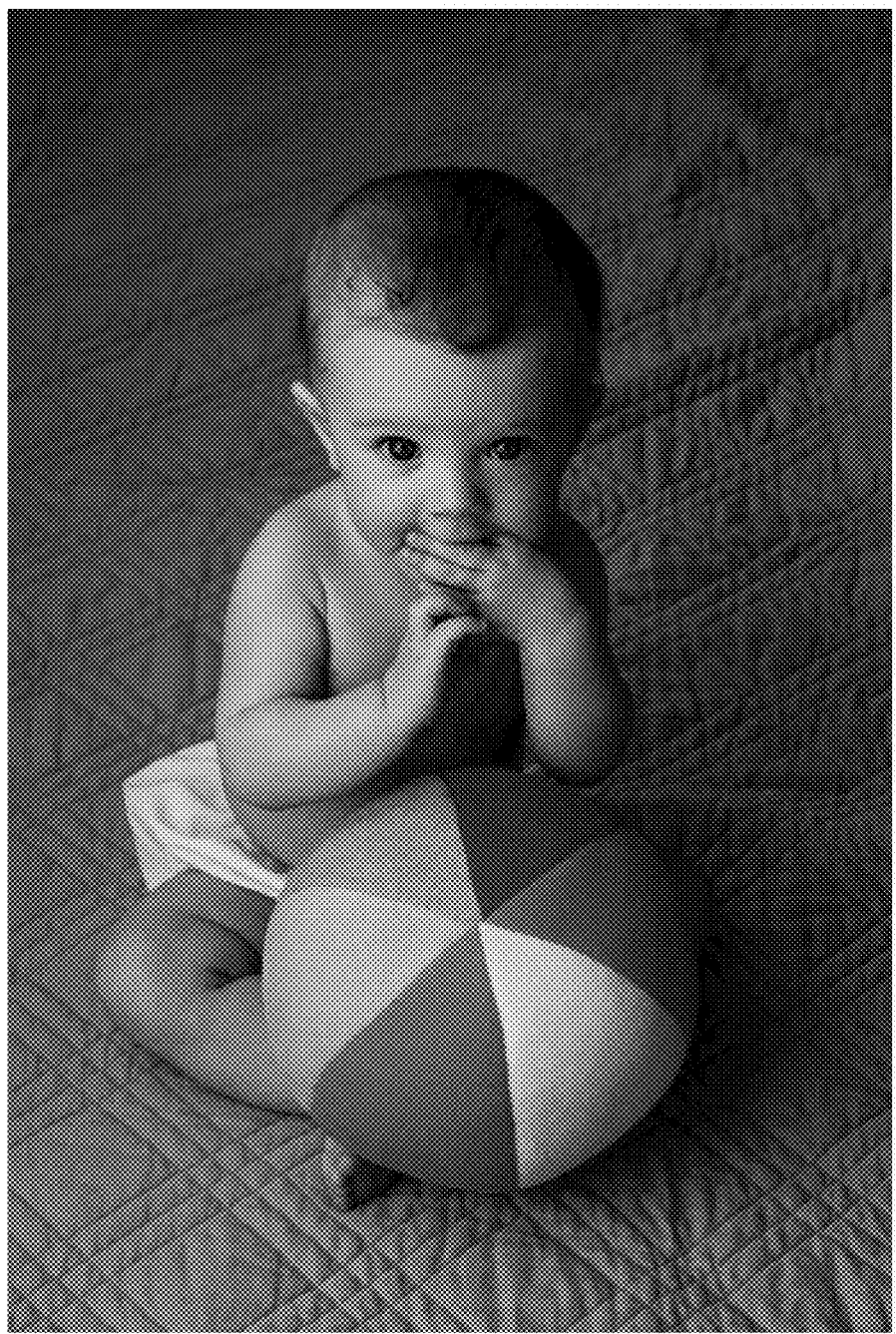

In (9a) and (9b), "highInput" is the user input 225, and can range between 1.25 and 2.5. In (9b), "inputRGB" is the input pixel red, green, and blue values. An example of a digital image that the computer system 100 generates by implementing (9a) and (9b) is shown in FIG. 3C.

The computer system 100 can subsequently combine the shadow image 210 and the highlight image 210 to generate a processed output image 235 using, for example, a luminance mask, or grayscale mask as shown in (10).

$$blurLum = \quad (10)$$
$$\sqrt{0.297377 \cdot inputR + 0.6273491 \cdot inputG + 0.0752741 \cdot inputB}$$

Alternatively, the computer system 100 can determine the mask using the channel maximum, as shown in (11).

$$blueLum = \max(inputR, inputG, inpugB) \quad (11)$$

Figure 3D:
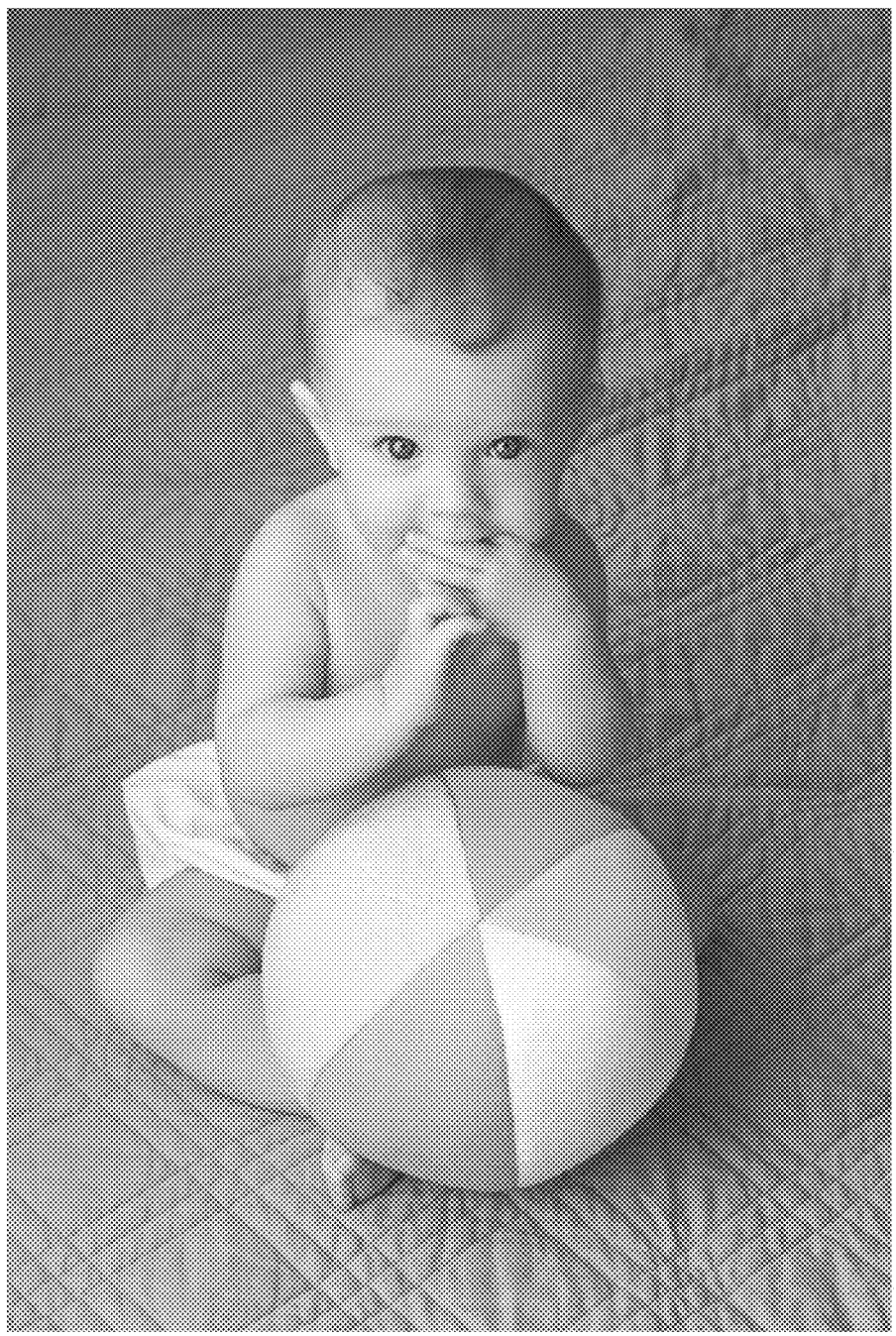

An example of a digital image that the computer system 100 generates by implementing (11) is shown in FIG. 3D. In some implementations, the computer system 100 can threshold the mask using a threshold function, which can create a smooth gradient on the mask as shown in (12).

$$origPercent = \quad (12)$$
$$\sqrt{smoothstep(0.0, 0.1 + 0.5 * shadAmt, blurLum)}$$

The computer system 100 can further multiply the smooth mask by its inverse so that black and white points of the image do not get impacted.

$$\text{origPercent} = \text{origPercent} \times (1 - \text{origPercent}) \quad (13)$$

Figure 3E:
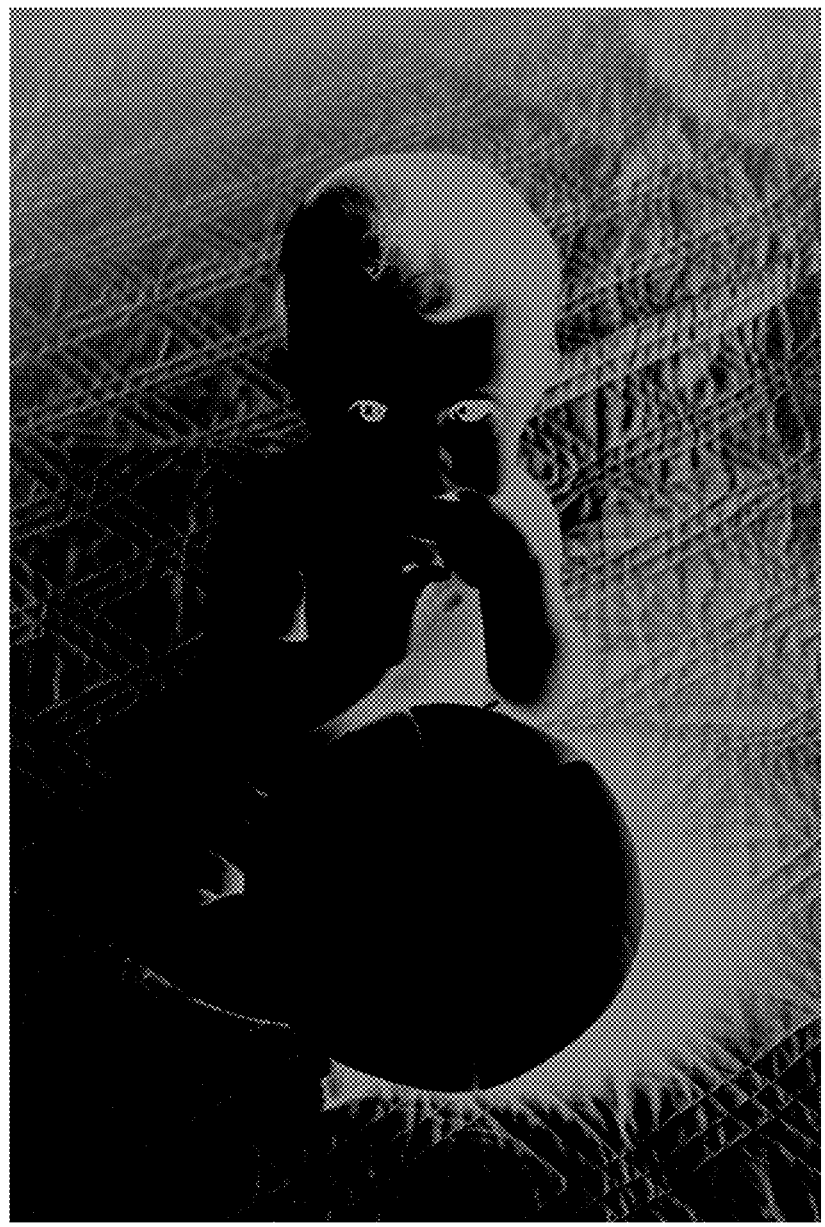

An example of a digital image that the computer system 100 generates by implementing (13) is shown in FIG. 3E. The computer system 100 can then blend the shadow image back with the original using origPercent as the mixing function, as shown in (14).

$$\text{Shad} = \text{mix}(\text{shad}, \text{orig}, \text{origPercent}) \quad (14)$$

Figure 3F:
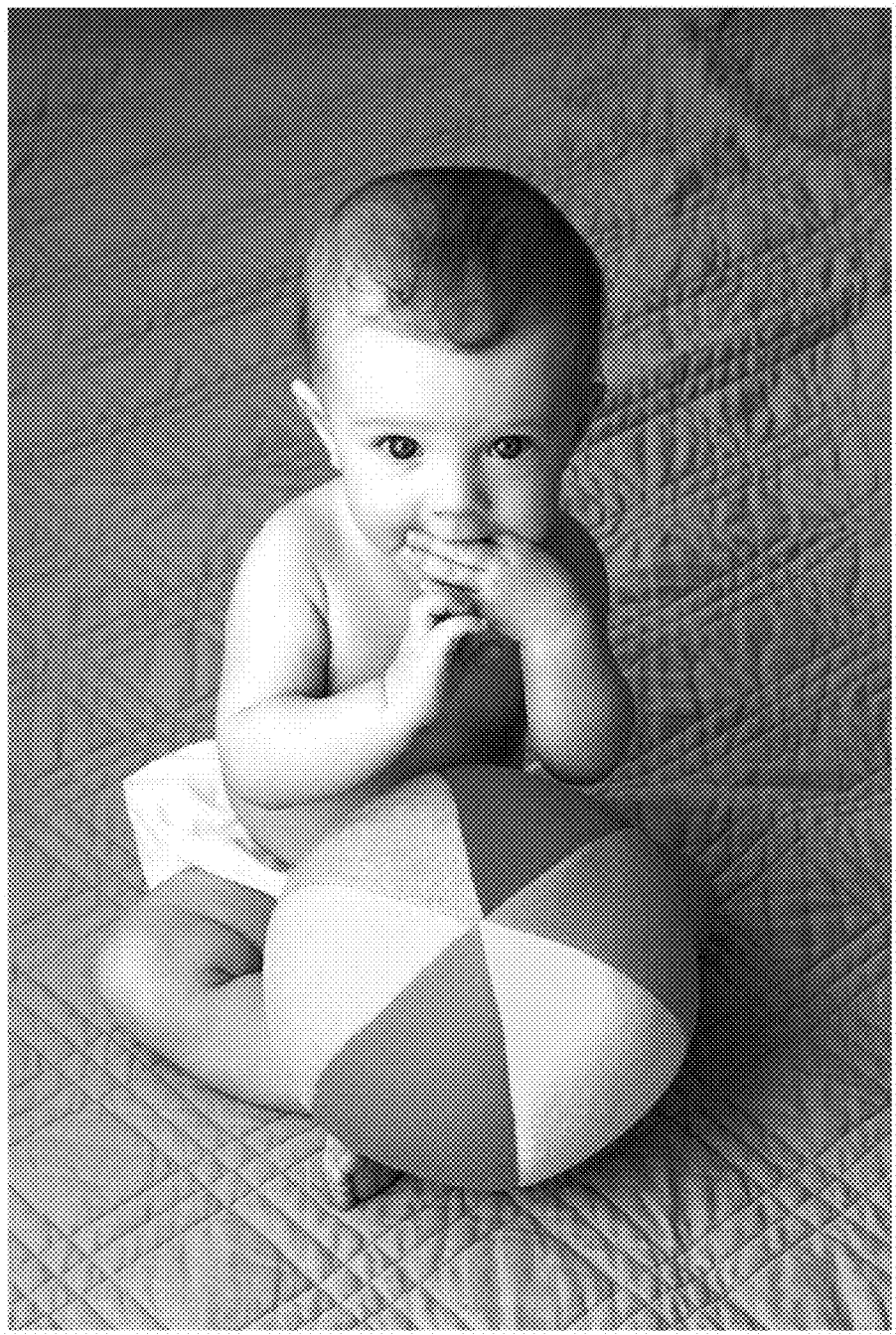

An example of a digital image that the computer system 100 generates by implementing (14) is shown in FIG. 3F. In this manner, the computer system 100 can determine a smooth mask for the shadow image 210 and apply the mask to the shadow image 210. The computer system 100 can similarly determine a smooth mask for the highlight image 220, for example, by implementing (15) and (16).

$$\text{origPercent} = 1 - \text{smoothstep}(0.2, 0.8, \text{blurLum}) \quad (15)$$

$$\text{high} = \text{mix}(\text{high}, \text{orig}, \text{origPercent}) \quad (16)$$

Figure 3G:
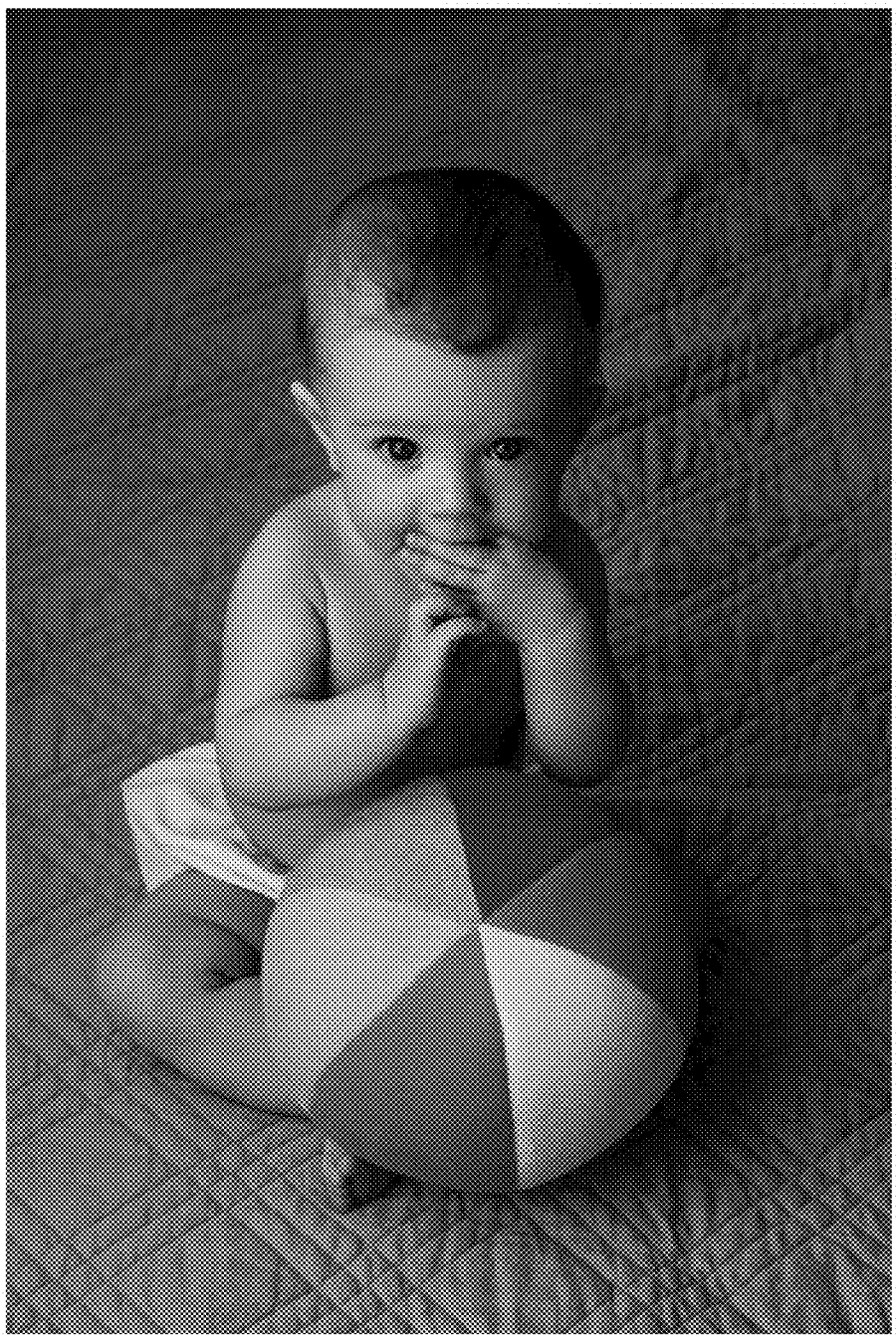
Figure 3H:
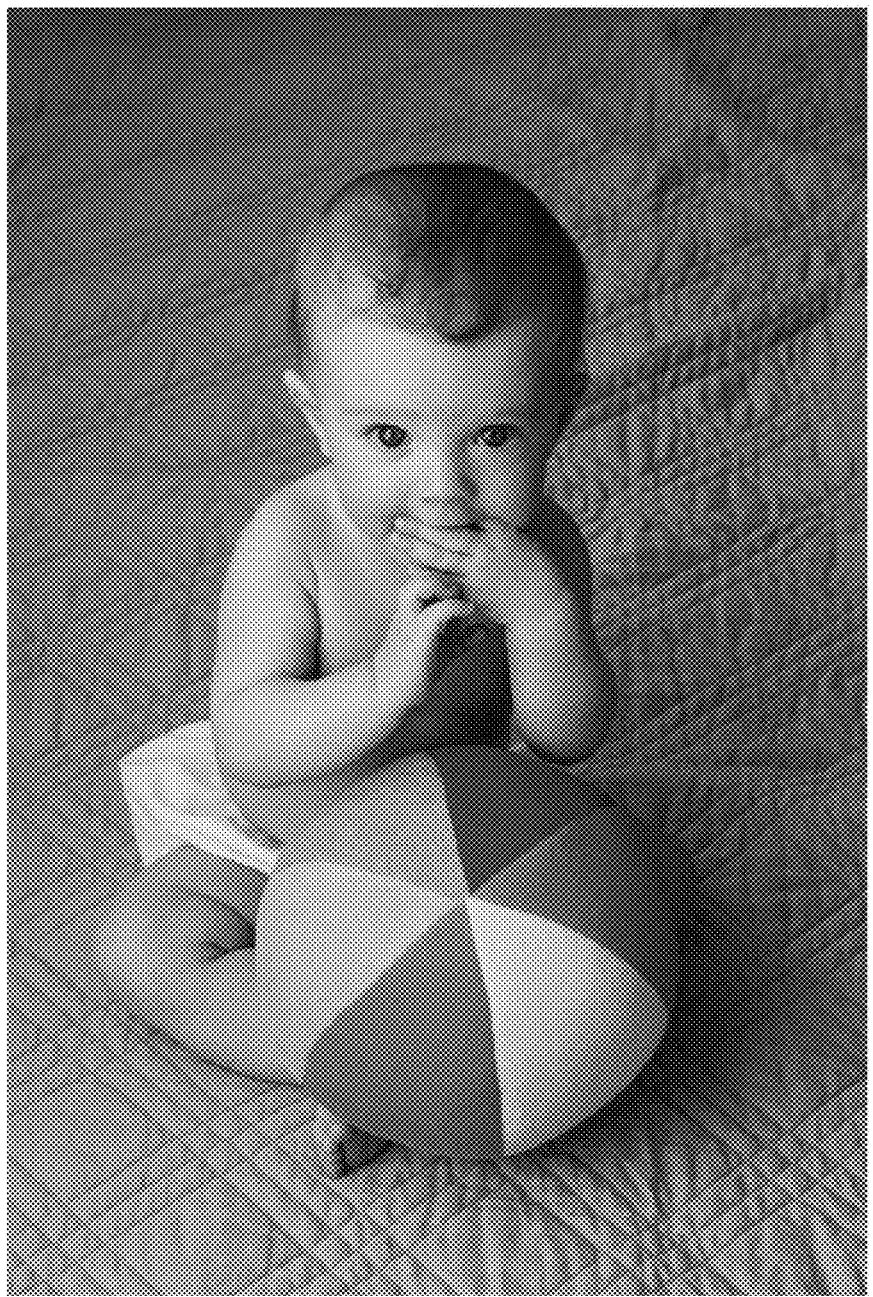

An example of a digital image that the computer system 100 generates by implementing (16) is shown in FIG. 3G. The computer system 100 can merge the processed highlight image back together with the blurred luminance, as shown in (17).

$$\text{final} = \text{mix}(\text{shad}, \text{high}, \text{blurLum}) \quad (17)$$

In some implementations, the computer system 100 can additionally add mid-contrast back into the image by calculating another gray image based upon the corrected final image, as shown in (18).

$$\text{gray} = 0.3 \times \text{final}R + 0.6 \times \text{final}G + 0.1 \times \text{final}B \quad (18)$$

The computer system can then adjust contrast by moving the final pixel value away from 0.5, for example, by implementing (19).

$$\text{final} = \text{final} + (\text{final} - 0.5) \times \text{effect} \times \text{gray} \quad (19)$$

In (19), "effect" can be a user input, a function of the inputShadAmount or a function of the gray value as well. In this manner, the computer system 100 can generate a final processed image, such as the digital image shown in FIG. 3H.

In some implementations, the computer system 100 can store each of the intermediate images (for example, the blurred image 205, the shadow image 210, the highlight image 220, the image shown in each of FIGS. 3A-3F, and the like) generated during the image processing for subsequent access. Alternatively, or in addition, the computer system 100 may not permanently store all of the intermediate images. In some implementations, the computer system 100 can implement the aforementioned image processing on a region of a received digital image, for example, a region identified by user input.

Figure 4:
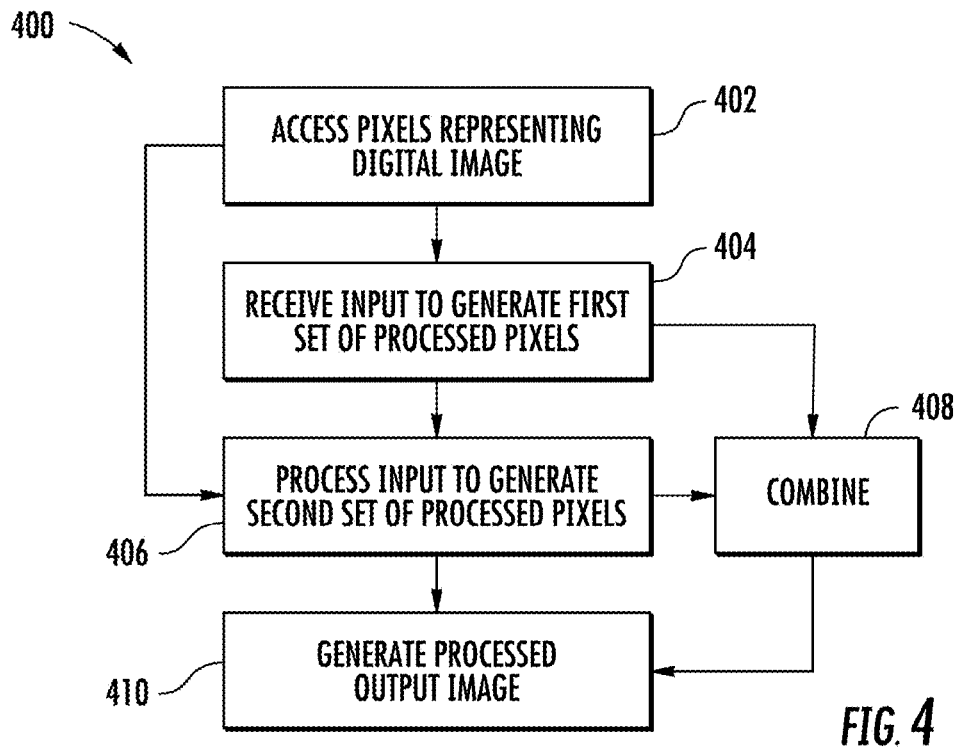
FIGS. 4-7 are flowcharts of example processes for generating a processed output image.

FIG. 4 shows a flowchart of an example process 400 to generate a processed output image. The process can be performed by a system of one or more computers configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the process 400. The process 400 receives pixels representing a digital image (step 402). The process 400 receives input to adjust darkness of the image (step 404). The process 400 receives input to adjust brightness of the image (step 406). The process 400 combines the adjusted images (step 408). The process 400 generates a processed output image (step 410).

Figure 5:
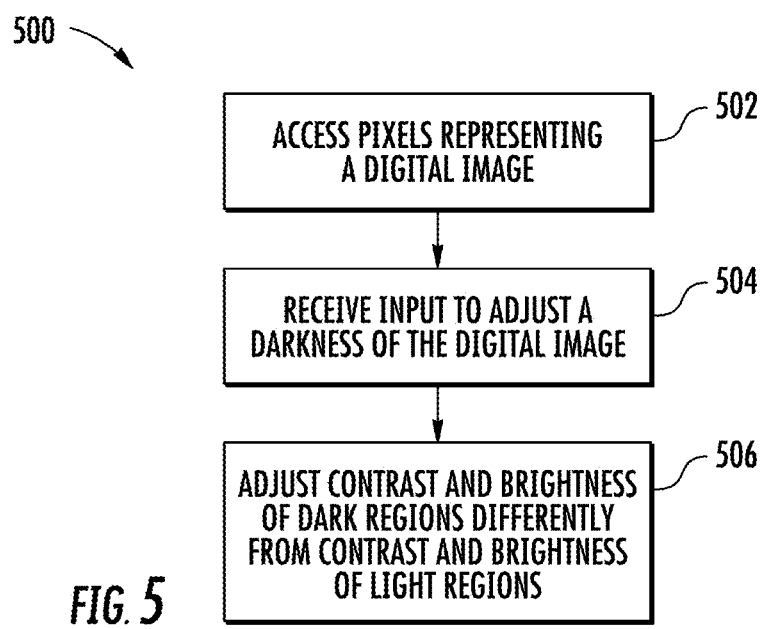

FIG. 5 shows a flowchart of an example process 500 to generate a processed output image. The process 500 receives pixels representing digital image (step 502). The process receives input to adjust a darkness of the digital image (step 504). The process adjusts a contrast and a brightness of dark regions differently from contrast and brightness of light regions (step 506).

Figure 6:
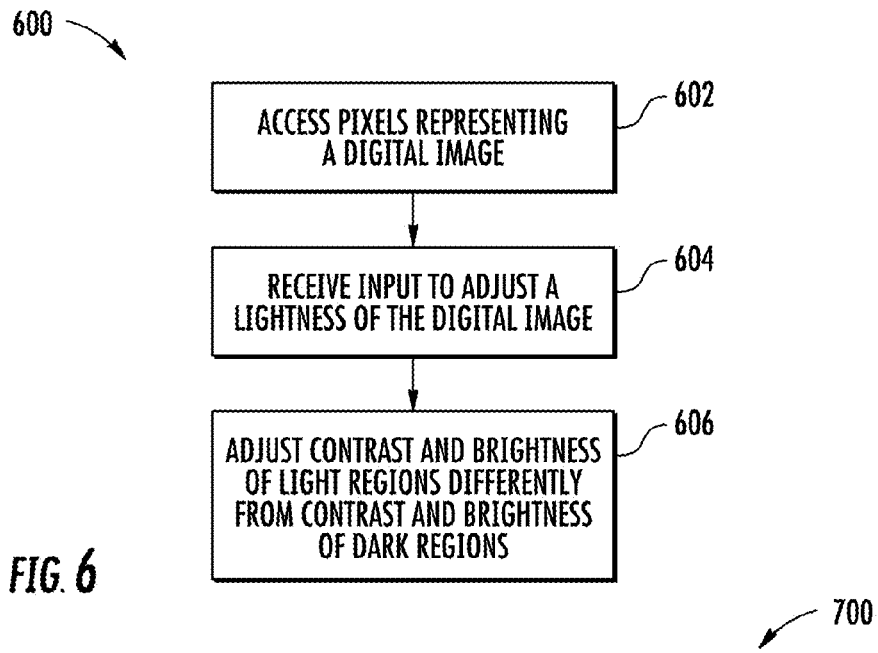

FIG. 6 shows a flowchart of an example process 600 to generate a processed output image. The process 600 receives pixels representing a digital image (step 602). The process 600 receives input to adjust a lightness of the digital image (step 604). The process 600 adjusts a contrast and a brightness of light regions differently from contrast and brightness of dark regions (step 506).

Figure 7:
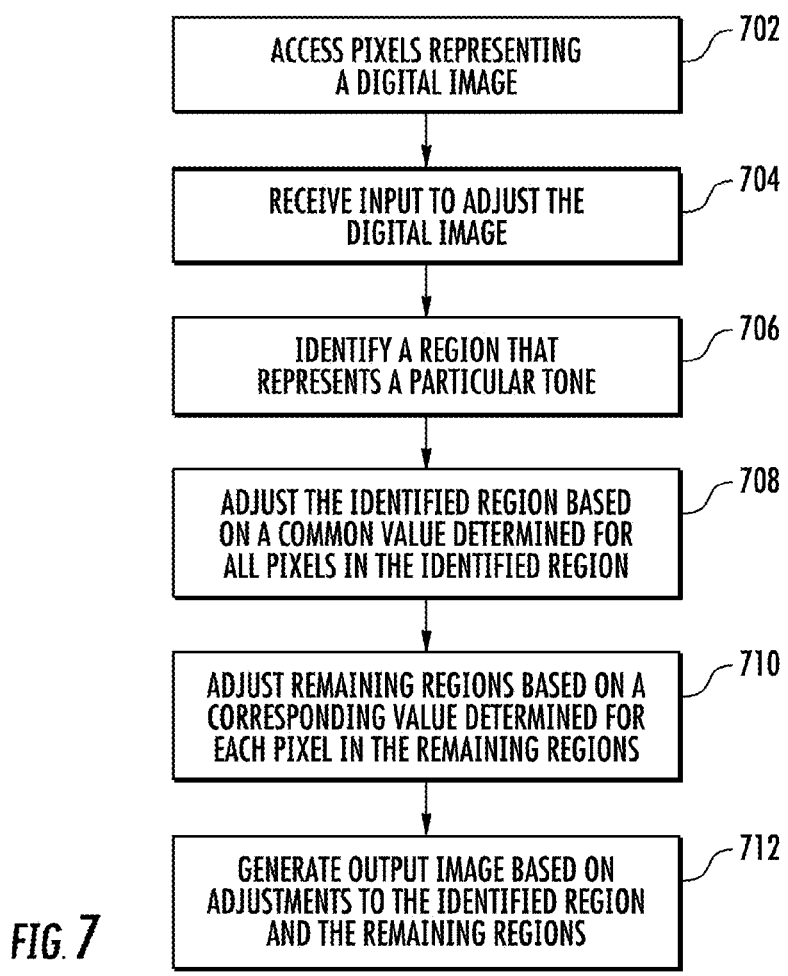

FIG. 7 shows a flowchart of an example process 700 to generate a processed output image. The process 700 receives multiple pixels that represent a digital image (step 702). The process 700 receives input to adjust the digital image (step 704). The process 700 identifies a region that represents a particular tone (step 706). The process 700 adjusts the identified region based on a common value determined for all pixels in the identified region (step 708). The process 700 adjusts remaining regions based on a corresponding value determined for each pixel in the remaining regions (step 710). The process 700 generates an output image based on adjustments to the identified region and the remaining regions (step 712).

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by one or more data processing apparatuses, the method comprising:
   accessing a plurality of pixels that represent a digital image;
   processing each of the accessed plurality of pixels based on a darkness of the digital image to adjust a contrast and a brightness of color space values of the plurality of pixels, resulting in a first plurality of processed pixels, wherein processing the accessed plurality of pixels based on a darkness of the digital image comprises:
   adjusting a red component, a blue component, and a green component of a color space value of each pixel in the accessed plurality of pixels according to a gamma function based on at least one of the following: a first blur, a first color scale value, and a first user input defining an adjustment to the contrast and the brightness based on the darkness, resulting in increasing a contrast and a brightness of dark regions and decreasing a contrast and a brightness of light regions;

processing each of the accessed plurality of pixels based on a lightness of the digital image to adjust a contrast and a brightness of the color space values of the plurality of pixels resulting in a second plurality of processed pixels, wherein processing the accessed plurality of pixels based on a darkness of the digital image comprises:

adjusting a red component, a blue component, and a green component of a color space value of each pixel in the accessed plurality of pixels according to a gamma function based on at least one of the following: a second blur, a second color scale value, and a second user input defining an adjustment to the contrast and the brightness based on the lightness, resulting in increasing a contrast and a brightness of light regions; and decreasing a contrast and a brightness of dark regions and combining the first plurality of processed pixels and the second plurality of processed pixels to generate a processed output image.

2. The method of claim 1, wherein either the first blur or the second blur is a Gaussian blur with a 2-pixel radius.

3. The method of claim 1, wherein either the first color value or the second color scale value is within a range of 0.4-2.0.

4. The method of claim 1, further comprising:
identifying a region in the digital image that represents a particular tone based on hue angles and brightness values of pixels included in the region; and
adjusting either the first user input or the second user input to modulate the gamma function in the identified region.

5. The method of claim 1, further comprising:
receiving input to adjust the darkness of the digital image; and
in response to receiving the input, determining corresponding values by which a red component, a blue component, and a green component of each pixel are to be adjusted based on the received input.

6. The method of claim 5, wherein processing each of the accessed plurality of pixels to adjust a contrast and the brightness of color space values of the plurality of pixels based on the darkness of the digital image further comprises:
adjusting a red component of a color space value of each pixel based on a determined corresponding value;
adjusting a blue component of a color space value of each pixel based on a determined corresponding value; and
adjusting a green component of a color space value of each pixel based on a determined corresponding value.

7. The method of claim 5, wherein processing each of the accessed plurality of pixels to adjust a contrast and a brightness of color space values of the plurality of pixels based on the darkness of the digital image further comprises:
determining a common adjustment value from the corresponding values; and
adjusting a color space value of each pixel based on the common adjustment value.

8. The method of claim 7, wherein the common value is one of a maximum of, a minimum of, an average of, or a median of the corresponding values.

9. The method of claim 1, wherein processing each of the accessed plurality of pixels to adjust the contrast and the brightness of color space values of the plurality of pixels based on the lightness of the digital image further comprises adjusting a red component, a blue component, and a green component of a color space value of each pixel according to a gamma function and according to a linear segment.

10. The method of claim 1, wherein combining the first plurality of processed pixels and the second plurality of processed pixels comprises combining using a luminance mask.

11. The method of claim 1, wherein processing based on the darkness of the image and processing based on the lightness of the image are order independent.

12. A non-transitory computer storage medium encoded with a computer program, the program comprising instructions that when executed by one or more data processing apparatuses cause the one or more data processing apparatus to perform operations comprising:
accessing a plurality of pixels that represent a digital image;
receiving a first user input to adjust a darkness of the digital image;
in response to receiving the first user input, adjusting the contrast and the brightness of color space values of the accessed plurality of pixels based on a darkness of the digital image to generate a processed shadow image, wherein the adjusting comprises adjusting the contrast and the brightness of dark regions of the digital image differently from the contrast and the brightness of light regions; and
combining the processed shadow image with a processed highlight image generated by adjusting the contrast and the brightness of the color space values of the accessed plurality of pixels based on a lightness of the digital image,
wherein adjusting the contrast and the brightness of the dark regions of the digital image differently from the contrast and the brightness of light regions comprises:
adjusting a red component, a blue component, and a green component of a color space value of each pixel in the accessed plurality of pixels according to a gamma function based on at least one of the following: a blur, a color scale value, and a second user input defining an adjustment to the contrast and the brightness based on the darkness, resulting in increasing a contrast and a brightness of dark regions while decreasing a contrast and a brightness of light regions.

13. The medium of claim 12, wherein the blur is a Gaussian blur having a pixel radius.

14. The medium of claim 13, wherein the pixel radius includes a maximum of five pixels.

15. The medium of claim 13, wherein the color scale value ranges from 0.4 to 2.0.

16. The medium of claim 13, the operations further comprising:
identifying a region in the digital image that represents a particular tone based on hue angles and brightness values of pixels included in the region; and
modifying the second user input to modulate the gamma function in the identified region.

17. The medium of claim 12, further comprising generating the processed highlight image by adjusting the contrast and the brightness of the color space values of the accessed plurality of pixels based on the lightness of the digital image.

18. The medium of claim 12, wherein combining the processed shadow image with the processed highlight image comprises combining using a luminance mask.

19. A system comprising:
one or more data processing apparatuses; and
a computer storage medium encoded with a computer program, the program comprising instructions that when executed by the one or more data processing apparatuses cause the one or more data processing apparatuses to perform operations comprising:

accessing a plurality of pixels that represent a digital image;

receiving a first user input to adjust a lightness of the digital image;

in response to receiving the first user input, adjusting a contrast and a brightness of color space values of the plurality of pixels based on a lightness of the digital image to generate a processed highlight image, wherein the adjusting comprises adjusting the contrast and the brightness of light regions of the digital image differently from the contrast of dark regions; and combining the processed light image with a processed shadow image generated by adjusting the contrast and the brightness of the color space values of the plurality of pixels based on a darkness of the digital image, wherein adjusting the contrast and the brightness of the light regions of the digital image differently from the contrast and the brightness of dark regions comprises:

adjusting a red component, a blue component, and a green component of a color space value of each pixel in the accessed plurality of pixels according to a gamma function based on at least one of the following: a blur, a color scale value, and a second user input defining an adjustment to the contrast and the brightness based on the darkness, resulting in increasing a contrast and a brightness of light regions while decreasing a contrast and a brightness of dark regions.

20. The system of claim 19, wherein adjusting the contrast and the brightness of color space values of the plurality of pixels based on the lightness of the digital image further comprises adjusting a red component, a blue component, and a green component of a color space value of each pixel according to a gamma function and according to a linear segment.

21. The system of claim 19, the operations further comprising generating the processed shadow image by adjusting the contrast and the brightness of the color space values of the plurality of pixels based on the darkness of the digital image.

22. The system of claim 19, wherein combining the processed highlight image with the processed shadow image comprises combining using a luminance mask.

23. A computer-implemented method comprising:

accessing a plurality of pixels that represent a digital image;

receiving input to adjust a darkness or a brightness of the digital image;

identifying a region in the digital image that represents a particular tone based on hue angles and brightness values of pixels included in the region;

adjusting the darkness or the brightness of the identified region in the digital image based on a common adjustment value determined for all pixels in the identified region;

adjusting the darkness or the brightness of remaining regions in the digital image based on a corresponding adjustment value determined for each pixel in the remaining regions; and generating an output image by combining the adjusted identified region in the digital image and the adjusted remaining regions in the digital image.

24. The method of claim 23, further comprising determining, for each pixel in the digital image, corresponding adjustment values by which a red component, a blue component, and a green component of each pixel are to be adjusted, wherein the corresponding values are based on the received input.

25. The method of claim 24, further comprising determining the common adjustment value from the corresponding values.

26. The method of claim 25, wherein the common adjustment value is one of a maximum of, a minimum of, an average of, or a median of the corresponding adjustment values.

27. The method of claim 23, wherein receiving input to adjust a darkness or a brightness of the digital image comprises:

receiving a first input to adjust a contrast and a brightness of color space values of the plurality of pixels based on the darkness of the image; and receiving a second input to adjust a contrast and a brightness of color space values of the plurality of pixels based on the lightness of the image.

28. The method of claim 27, further comprising:

adjusting the darkness of the digital image in response to receiving the first input; and adjusting the brightness of the digital image in response to receiving the second input.

* * * * *